(12) United States Patent
Yokoi et al.

(10) Patent No.: US 7,841,169 B2
(45) Date of Patent: Nov. 30, 2010

(54) REGENERATION CONTROLLER FOR EXHAUST PURIFICATION APPARATUS OF INTERNAL COMBUSTION ENGINE

(75) Inventors: Tatsuhisa Yokoi, Toyota (JP); Yasuhiko Otsubo, Toyota (JP); Shigehiro Matsuno, Toyota (JP); Hiroki Matsuoka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 11 days.

(21) Appl. No.: 10/589,204

(22) PCT Filed: Mar. 10, 2005

(86) PCT No.: PCT/JP2005/004733

§ 371 (c)(1),
(2), (4) Date: Aug. 11, 2006

(87) PCT Pub. No.: WO2005/088095

PCT Pub. Date: Sep. 22, 2005

(65) Prior Publication Data

US 2007/0169466 A1 Jul. 26, 2007

(30) Foreign Application Priority Data

Mar. 11, 2004 (JP) ............................. 2004-068996

(51) Int. Cl.
*F01N 3/00* (2006.01)

(52) U.S. Cl. .............................. 60/295; 60/274; 60/285; 60/297; 60/303

(58) Field of Classification Search .................. 60/274, 60/285, 286, 295, 297, 303, 311
See application file for complete search history.

(56) References Cited

U.S. PATENT DOCUMENTS 4,509,327 A  4/1985 Enga (Continued)

FOREIGN PATENT DOCUMENTS

DE  10 2004 015 545 A1  11/2004

(Continued)

OTHER PUBLICATIONS

Japanese Office Action, Appln. No. 2004-068996, dated Jul. 24, 2007.

*Primary Examiner*—Tu M Nguyen
(74) *Attorney, Agent, or Firm*—Kenyon & Kenyon LLP

(57) ABSTRACT

A regeneration controller for preventing a large amount of particulate matter from being suddenly burned without increasing the frequency a heating process is performed. The regeneration controller includes an ECU(70) for heating an exhaust purification apparatus to eliminate the particulate matter accumulated in the exhaust purification apparatus when an estimated accumulation amount is greater than a reference accumulation amount. The ECU(70) obtains the estimated accumulation amount by estimating the amount of particulate matter accumulated in the exhaust purification apparatus. Furthermore, the ECU (70) changes modes for heating an exhaust purification apparatus when the regeneration controller is heated and an estimated accumulation amount is within a mode change range.

22 Claims, 9 Drawing Sheets

U.S. PATENT DOCUMENTS

| | | | |
|---|---|---|---|
| 4,615,172 A | 10/1986 | Mayer | |
| 4,813,233 A | 3/1989 | Vergeer et al. | |
| 5,319,930 A | 6/1994 | Shinzawa et al. | |
| 5,983,157 A | 11/1999 | Sugitani | |
| 6,128,899 A | 10/2000 | Oono et al. | |
| 6,622,480 B2* | 9/2003 | Tashiro et al. | 60/295 |
| 6,851,258 B2* | 2/2005 | Kawashima et al. | 60/311 |
| 6,901,750 B2 | 6/2005 | Toshioka et al. | |
| 6,931,842 B2 | 8/2005 | Ohtake et al. | |
| 6,948,311 B2 | 9/2005 | Schaller et al. | |
| 6,959,541 B2* | 11/2005 | Kosaka et al. | 60/295 |
| 7,013,638 B2* | 3/2006 | Hiranuma et al. | 60/286 |
| 7,043,903 B2* | 5/2006 | Onodera et al. | 60/295 |
| 7,062,906 B2 | 6/2006 | Otake et al. | |
| 7,086,220 B2* | 8/2006 | Imai et al. | 60/274 |
| 7,111,455 B2* | 9/2006 | Okugawa et al. | 60/295 |
| 7,210,286 B2* | 5/2007 | Sun et al. | 60/295 |
| 7,600,373 B2* | 10/2009 | Matsuno et al. | 60/295 |
| 7,607,290 B2* | 10/2009 | Matsuoka et al. | 60/286 |
| 2004/0035101 A1 | 2/2004 | Imai et al. | |
| 2004/0055279 A1 | 3/2004 | Plote | |

FOREIGN PATENT DOCUMENTS

| | | |
|---|---|---|
| EP | 1 234 959 A2 | 8/2002 |
| EP | 1 388 647 A2 | 2/2004 |
| EP | 1 394 373 A1 | 3/2004 |
| EP | 1 400 663 A1 | 3/2004 |
| JP | 05-222919 | 8/1993 |
| JP | 06-173641 | 6/1994 |
| JP | 2002-227688 | 8/2002 |
| JP | 2003-003833 | 1/2003 |
| JP | 2003-020930 | 1/2003 |
| JP | 2004-183525 A | 7/2004 |
| JP | 2005-090390 | 4/2005 |
| JP | 2005-214203 A | 8/2005 |
| KR | 1989-0002524 | 4/1989 |
| WO | WO 03/001038 A1 | 1/2003 |

* cited by examiner

US 7,841,169 B2

REGENERATION CONTROLLER FOR EXHAUST PURIFICATION APPARATUS OF INTERNAL COMBUSTION ENGINE

INCORPORATION BY REFERENCE

This is a 371 national phase application of PCT/JP2005/004733 filed 10 Mar. 2005, claiming priority to Japanese Patent Application No. 2004-068996 filed 11 Mar. 2004, the contents of which are incorporated herein by reference.

FIELD OF THE INVENTION

The present invention relates to a regeneration controller that heats and eliminates particulate matter accumulated in an exhaust purification apparatus, in which the purification apparatus is arranged in the exhaust system of an internal combustion engine.

BACKGROUND OF THE INVENTION

Japanese Laid-Open Patent Publication Nos. 2002-227688 and 2003-020930 describe a technique that is used when a large amount of particulate matter (PM) accumulates in a filter, which is arranged in an exhaust system of a diesel engine. In such a case, the air-fuel ratio of the exhaust is repeatedly adjusted between a rich state and a lean state to heat the filter and burn the particulate matter in the filter.

However, if the air-fuel ratio of the exhaust is repeatedly adjusted between a rich state and a lean state when a large amount of particulate matter is accumulated in the filter, a large amount of particulate matter would be suddenly burned. This may cause overheating of the filter and cause thermal deterioration.

To prevent overheating when burning a large amount of particulate matter, the filter may be heated when the amount of particulate matter accumulated in the filter is relatively small so as to burn the particulate matter in small amounts. However, this would increase the frequency of filter heating. Thus, the consumption of fuel used to enrich the air-fuel ratio would increase and thus reduce fuel efficiency.

In another technique, particulate matter is slowly burned when the air-fuel ratio of exhaust is relatively low (e.g., when the air-fuel ratio is slightly greater than the stoichiometric air-fuel ratio). When the state of the engine is changing or when the accumulation of the particulate matter is uneven, there may be errors in a detection value or estimation value representing the amount of accumulated particulate matter. Accordingly, the heating of the filter may end when the particulate matter is still not completely eliminated from the filter. Such residual particulate matter may cause sudden burning of a large amount of particulate matter and thus overheat the filter.

SUMMARY OF THE INVENTION

It is an object of the present invention to provide a regeneration controller that prevents a large amount of particulate matter from burning suddenly without having to increase the frequency of heating.

One aspect of the present invention is a regeneration controller for eliminating particulate matter accumulated in an exhaust purification apparatus that is arranged in an exhaust system of an internal combustion engine. The regeneration controller includes a heating section for heating the exhaust purification apparatus to eliminate the particulate matter accumulated in the exhaust purification apparatus when an estimated accumulation amount is greater than a reference accumulation amount. The heating section obtains the estimated accumulation amount by estimating the amount of particulate matter accumulated in the exhaust purification apparatus. A mode change section changes exhaust purification apparatus heating modes when heating the purification apparatus if the estimated accumulation amount is within a mode change range.

Another aspect of the present invention is a method for eliminating particulate matter accumulated in an exhaust purification apparatus arranged in an exhaust system of an internal combustion engine. The method includes estimating the amount of particulate matter accumulated in the exhaust purification apparatus to obtain an estimated accumulation amount, determining whether the estimated accumulation amount is greater than a reference accumulation amount, adding fuel to exhaust when the estimated accumulation amount is greater than the reference accumulation amount, determining whether the estimated accumulation amount is less than or equal to a determination value, which is less than the reference accumulation amount, and intermittently adding fuel to the exhaust when the estimated accumulation amount is less than or equal to the determination value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

Figure 1:
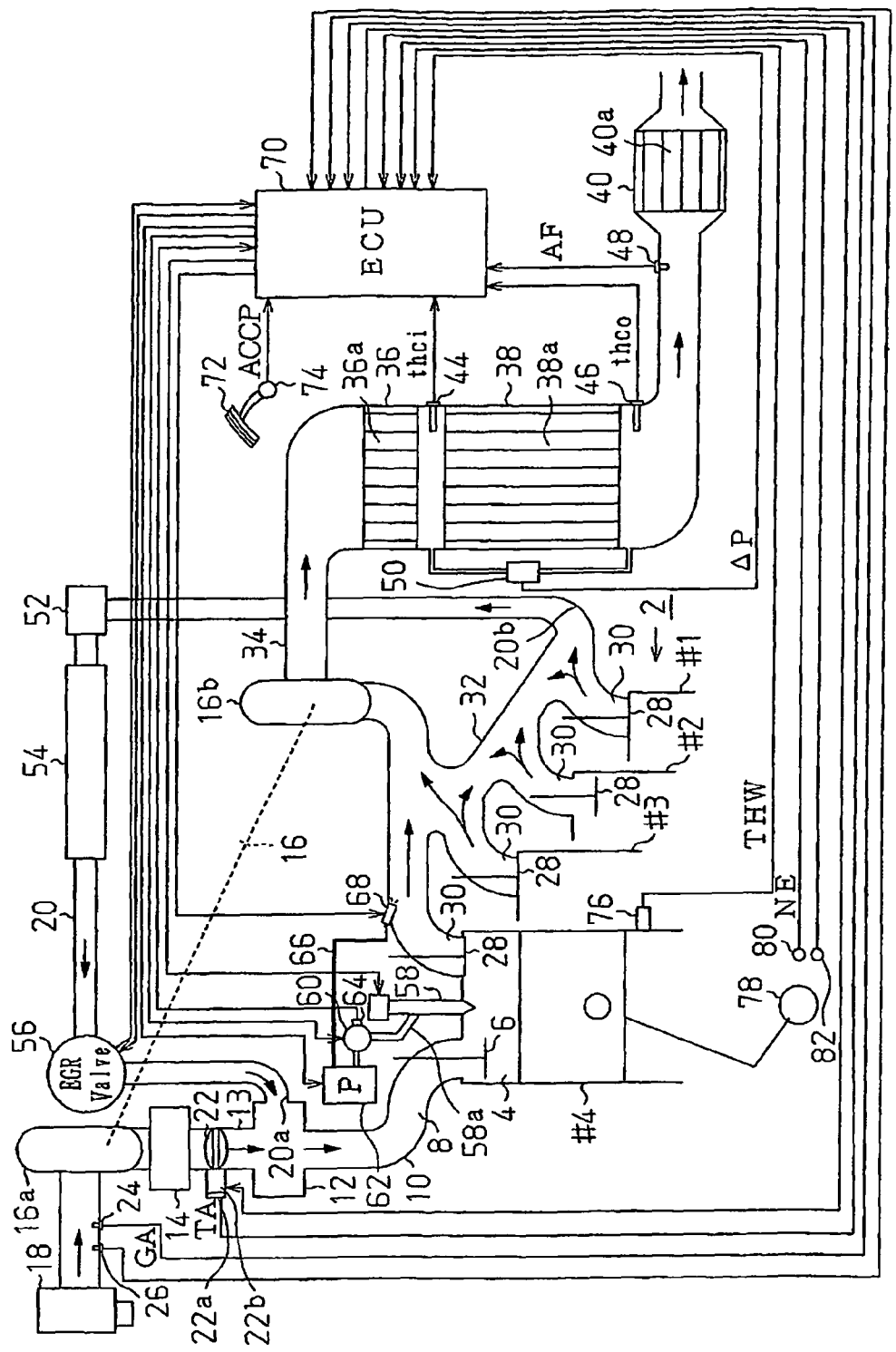
FIG. 1 is a schematic diagram showing a control system of a vehicle diesel engine according to a first embodiment of the present invention.

A regeneration controller for an exhaust purification apparatus of an internal combustion engine according to a first embodiment of the present invention will now be discussed. FIG. 1 is a schematic diagram of a control system including the regeneration controller, which is applied to a vehicle diesel engine. The application of the regeneration controller of the present invention is not limited to a diesel engine. That is, the regeneration controller of the present invention is also applicable to a lean-burn gasoline engine.

A diesel engine 2 includes a plurality of cylinders including first to fourth cylinders #1, #2, #3, and #4. In each of the cylinders #1 to #4, a combustion chamber 4 is connected to a surge tank 12 via an intake port 8 and an intake manifold 10. Each intake port 8 is opened and closed by an intake valve 6. The surge tank 12 is connected to an intercooler 14 and a supercharger such as an exhaust turbocharger 16. Fresh air supplied via an air cleaner 18 is compressed by a compressor 16a of the exhaust turbocharger 16. The surge tank 12 has an EGR gas supply port 20a of an exhaust recirculation (EGR) passage 20. A throttle valve 22 is arranged in an intake passage 13 between the surge tank 12 and the intercooler 14. An intake air amount sensor 24 and an intake air temperature sensor 26 are arranged between the compressor 16a and the air cleaner 18.

In each of the cylinders #1 to #4, the combustion chamber 4 is connected to an exhaust port 30 and an exhaust manifold 32. Each exhaust port 30 is opened and closed by an exhaust valve 28. An exhaust turbine 16b of the exhaust turbocharger 16 is arranged between the exhaust manifold 32 and the exhaust passage 34. The exhaust is sent into the exhaust turbine 16b from a position in the exhaust manifold 32 close to the fourth cylinder #4.

Three exhaust purification mechanisms, each accommodating an exhaust purification catalyst, namely, catalytic converters 36, 38, and 40, are arranged in the exhaust passage 34. The first catalytic converter 36 (first exhaust purification apparatus), which is positioned the furthest upstream, accommodates a NOx storage reduction catalyst 36a. When the exhaust of the diesel engine 2, which is operating normally, is in an oxidation atmosphere (lean), NOx is stored in the NOx storage reduction catalyst 36a. When the exhaust is in a reduction atmosphere (stoichiometric or air-fuel ratio being lower than that the stoichiometric condition), the NOx stored in the NOx storage reduction catalyst 36a is reduced to NO, separated from the NOx storage reduction catalyst 36a, and further reduced using HC and CO. In this way, NOx is eliminated.

The second catalytic converter 38 (second exhaust purification apparatus), which is arranged downstream from the first catalytic converter 36, accommodates a filter 38a having a monolithic structure. Walls of the filter 38a have pores that permit the passage of exhaust. The porous wall surface of the filter 38a is coated with a layer of a NOx storage reduction catalyst. The filter 38a functions as a base for the NOx storage reduction catalyst layer. The NOx storage reduction catalyst layer eliminates NOx in the same manner as the NOx storage reduction catalyst 36a. Particulate matter (PM) contained in the exhaust is accumulated in the wall of the filter 38a. The PM is first oxidized by active oxygen released when NOx is exposed in an oxidation atmosphere under a relatively high temperature. Then, the PM is entirely oxidized by the surrounding excess oxygen. In this way, not only NOx but also PM is eliminated from the filter 38a. The first catalytic converter 36 is formed integrally with the second catalytic converter 38.

The third catalytic converter 40, which is positioned the farthest downstream, accommodates an oxidation catalyst 40a for eliminating HC and CO through oxidation. A first exhaust temperature sensor 44 is arranged between the NOx storage reduction catalyst 36a and the filter 38a. Between the filter 38a and the oxidation catalyst 40a, a second exhaust temperature sensor 46 is arranged near the filter 38a, and an air-fuel ratio sensor 48 is arranged near the oxidation catalyst 40a.

The air-fuel ratio sensor 48 is, for example, a sensor using a solid electrolyte. The air-fuel ratio sensor 48 detects the air-fuel ratio of the exhaust based on exhaust components and generates a voltage signal, which is linearly proportional to the air-fuel ratio. The first exhaust temperature sensor 44 and the second exhaust temperature sensor 46 respectively detect exhaust temperatures thci and thco at their respective locations.

A pressure difference sensor 50 is connected to a pipe connecting the upstream side and downstream side of the filter 38a. The pressure difference sensor 50 detects the pressure difference ΔP between the upstream and downstream sides of the filter 38a to detect the clogging degree of the filter 38a, that is, the degree of accumulation of PM in the filter 38a.

The exhaust manifold 32 has an EGR gas inlet 20b for the EGR passage 20 located near the first cylinder #1, or distant from the fourth cylinder #4 that sends exhaust into the exhaust turbine 16b.

A steel EGR catalyst 52 for reforming the EGR gas, a cooler 54 for cooling the EGR gas, and an EGR valve 56 are arranged in the EGR passage 20 in this order from the EGR gas inlet 20b. The EGR catalyst 52 also functions to prevent clogging of the cooler 54. The amount of EGR gas that is to be supplied again to the intake system via the EGR gas supply port 20a is adjusted according to the opening degree of the EGR valve 56.

A fuel injection valve 58 is arranged in each of the cylinders #1 to #4 and directly injects fuel into the corresponding combustion chamber 4. Each fuel injection valve 58 is connected to a common rail 60 via a fuel supply pipe 58a. A variable discharge amount fuel pump 62, which is electrically controlled, supplies high-pressure fuel into the common rail 60. The high-pressure fuel in the common rail 60 is distributed to the corresponding fuel injection valve 58 via each fuel supply pipe 58a. A fuel pressure sensor 64 detects the pressure of fuel in the common rail 60.

The fuel pump 62 supplies low-pressure fuel to a fuel adding valve 68 via a fuel supply pipe 66. The fuel adding valve 68 is arranged in an exhaust port 30 of the fourth cylinder #4 to inject fuel toward the exhaust turbine 16b. The fuel adding valve 68 adds fuel to the exhaust in a catalyst control mode.

An electronic control unit (ECU) 70 includes a digital computer system including a CPU, a ROM, a RAM, and drive circuits. The drive circuit drives various units. The ECU 70 is provided with detection signals from the intake air amount sensor 24, the intake air temperature sensor 26, the first exhaust temperature sensor 44, the second exhaust temperature sensor 46, the air-fuel ratio sensor 48, the pressure difference sensor 50, an EGR opening degree sensor included in the EGR valve 56, a fuel pressure sensor 64, a throttle opening degree sensor 22a, an accelerator opening degree sensor 74, a coolant temperature sensor 76, an engine speed sensor 80, and a cylinder distinction sensor 82. The accelerator opening degree sensor 74 detects the depression amount of an accelerator pedal 72 (accelerator opening degree ACCP). The coolant temperature sensor 76 detects the coolant temperature THW of the diesel engine 2. The engine speed sensor 80 detects the engine speed NE, or rotation speed of the crankshaft 78. The cylinder distinction sensor 82 detects the rotational phase of the crankshaft 78 or the rotational phase of an intake cam to distinguish cylinders.

The ECU 70 determines the driving state of the engine from these detection signals to control fuel injection (amount and timing) of the fuel injection valves 58 according to the driving state of the engine. The ECU 70 executes control for adjusting the opening degree of the EGR valve 56, adjusting the throttle opening degree with a motor 22b, and adjusting the discharge amount of the fuel pump 62. Further, the ECU 70 executes catalyst control including a regeneration mode, a sulfur components decomposition-release mode (hereinafter referred as a sulfur elimination mode), a NOx reduction mode, and a normal control mode. The catalyst control will be described later.

The ECU 70 executes a combustion mode selected from two combustion modes, namely, a normal combustion mode and a low temperature combustion mode, according to the driving state of the engine. In the low temperature combustion mode, the ECU 70 simultaneously reduces NOx and smoke by slowing the increase of the combustion temperature by using a large recirculation amount of exhaust based on an EGR valve opening degree map for the low temperature combustion mode. The low temperature combustion mode is executed when the engine is in a range in which the engine load is low and the engine speed is low or intermediate. In the low temperature combustion mode, the ECU 70 executes air-fuel ratio feedback control including adjustment of a throttle opening degree TA based on the air-fuel ratio AF detected by the air-fuel ratio sensor 48. A combustion mode other than the low temperature combustion mode is the normal combustion mode. In the normal combustion mode, the ECU 70 executes normal EGR control (including control that involves no recirculation of the exhaust) based on an EGR valve opening degree map for the normal combustion mode.

The catalyst control will now be described.

In the regeneration mode, the ECU 70 particularly heats PM accumulated in the filter 38*a* of the second catalytic converter 38 when the estimated accumulation amount of PM in the exhaust purification catalyst reaches a regeneration reference value. The PM is heated to be oxidized and decomposed to generate $CO_2$ and $H_2O$ and is released as $CO_2$ and $H_2O$ (PM release heating). In the regeneration mode, the ECU 70 repeatedly adds fuel with the fuel adding valve 68 to heat (e.g., 600 to 700° C.) the catalyst bed at an air-fuel ratio that is higher than the stoichiometric air-fuel ratio. The ECU 70 may further perform fuel injection (after injection) in each combustion chamber 4 with the corresponding fuel injection valve 58 during the power stroke or the exhaust stroke. The ECU 70 further executes burn-up heating by executing an intermittent fuel adding process. In the intermittent fuel adding process, the ECU 70 executes an air-fuel ratio lowering process in between periods in which no fuel is added. The air-fuel ratio lowering process lowers (enriches) the air-fuel ratio to be the same as or slightly lower than the stoichiometric air-fuel ratio by intermittently adding fuel from the fuel adding valve 68. In this embodiment, the air-fuel ratio lowering process causes the air-fuel ratio to be slightly lower than the stoichiometric air-fuel ratio. In certain cases, the after injection with the fuel injection valves 58 and the intermittent fuel adding process may be performed in combination. The regeneration mode increases the temperature to a level in which the NOx storage reduction catalyst 36*a* and the filter 38*a* do not overheat. Further, the regeneration mode generates active oxygen. This produces an effect that burns up the PM. Thus, the PM clogging at the front surface of the NOx storage reduction catalyst 36*a* is eliminated, and the PM accumulated in the filter 38*a* is burned.

The sulfur elimination mode is executed when the NOx storage reduction catalyst 36*a* and the filter 38*a* are poisoned by sulfur components and their exhaust purification capacity such as NOx storage capacity is lowered. The sulfur elimination mode decomposes and releases sulfur components from the NOx storage reduction catalyst 36*a* and the filter 38*a* so that the NOx storage reduction catalyst 36*a* and the filter 38*a* are rid of sulfur components and restored from sulfur poisoning. In the sulfur elimination mode, the ECU 70 heats the catalyst bed (e.g., to 650° C.) by repeatedly adding fuel from the fuel adding valve 68. The ECU 70 further executes an air-fuel ratio lowering process that lowers the air-fuel ratio to be the same as or slightly lower than the stoichiometric air-fuel ratio by intermittently adding fuel from the fuel adding valve 68. In the first embodiment, the air-fuel ratio lowering process enriches the air-fuel ratio to be slightly lower than the stoichiometric air-fuel ratio. In the sulfur elimination mode, the after injection using the fuel injection valve 58 may also be executed. This process is similar to the intermittent fuel adding process executed in the regeneration mode and also has the effect of burning up the PM. Accordingly, the ECU 70 may stop the burn-up heating when the sulfur elimination mode is being executed or when there is a request for execution of the sulfur elimination mode.

In the NOx reduction mode, NOx occluded in the NOx storage reduction catalyst 36*a* and the filter 38*a* is reduced to $N_2$, $CO_2$, and $H_2O$, and is released as $N_2$, $CO_2$, and $H_2O$. In the NOx reduction mode, the ECU 70 intermittently adds fuel from the fuel adding valve 68 at relatively long time intervals so that the temperature of the catalyst bed is set relatively low (e.g., 250 to 500° C.). At such a relatively low catalyst bed temperature, the air-fuel ratio is lowered to be the same as or slightly lower than the stoichiometric air-fuel ratio.

The catalyst control excluding the three catalyst control modes described above is the normal control mode. In the normal control mode, the ECU 70 does not perform the fuel addition process with the fuel adding valve 68 and the after injection with the fuel injection valve 58.

Figure 2:
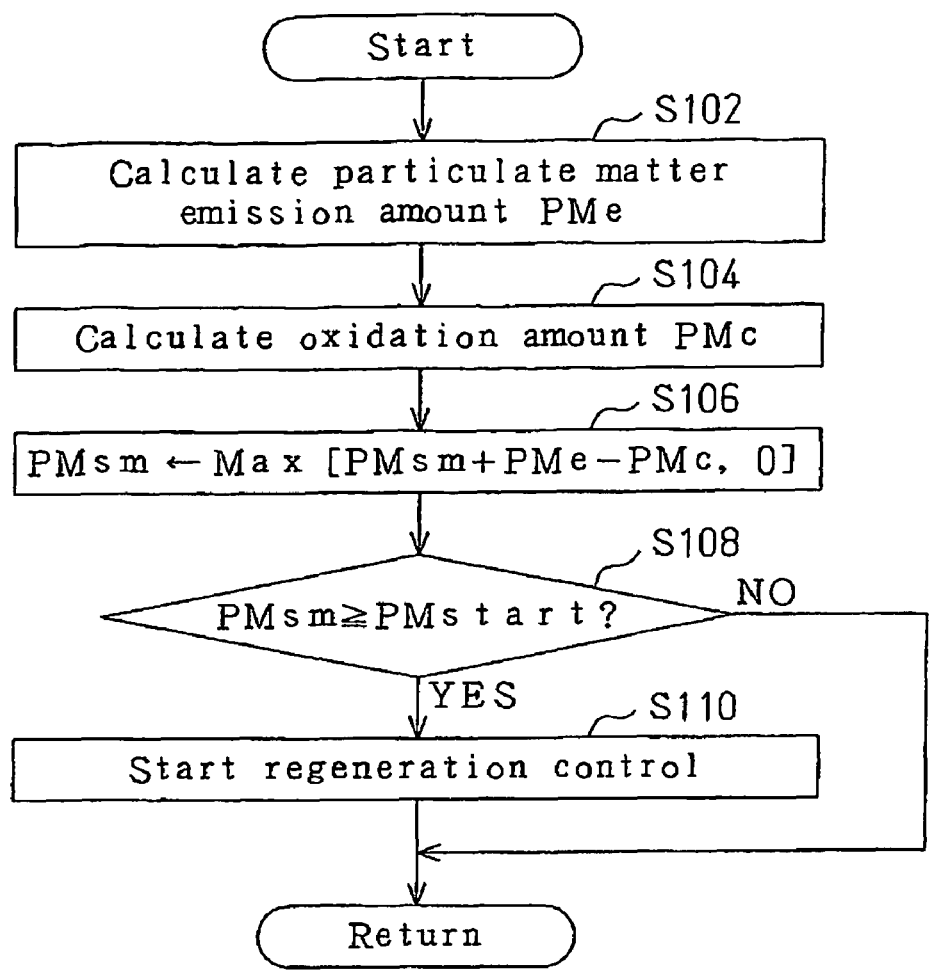
FIG. 2 is a flowchart showing regeneration mode execution determination performed by an ECU shown in FIG. 1.
Figure 3:
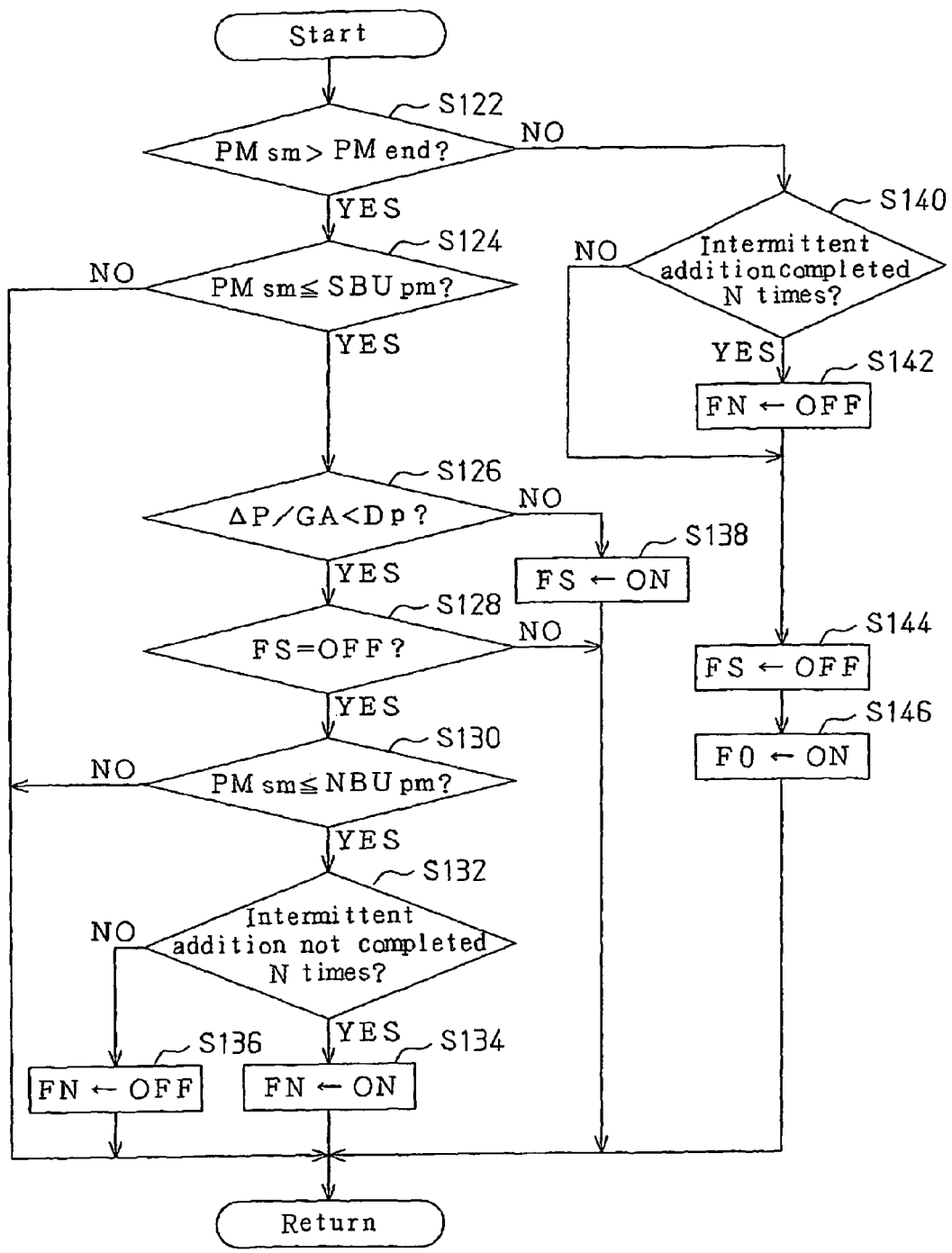
FIG. 3 is a flowchart showing regeneration control performed by the ECU of FIG. 1.
Figure 4:
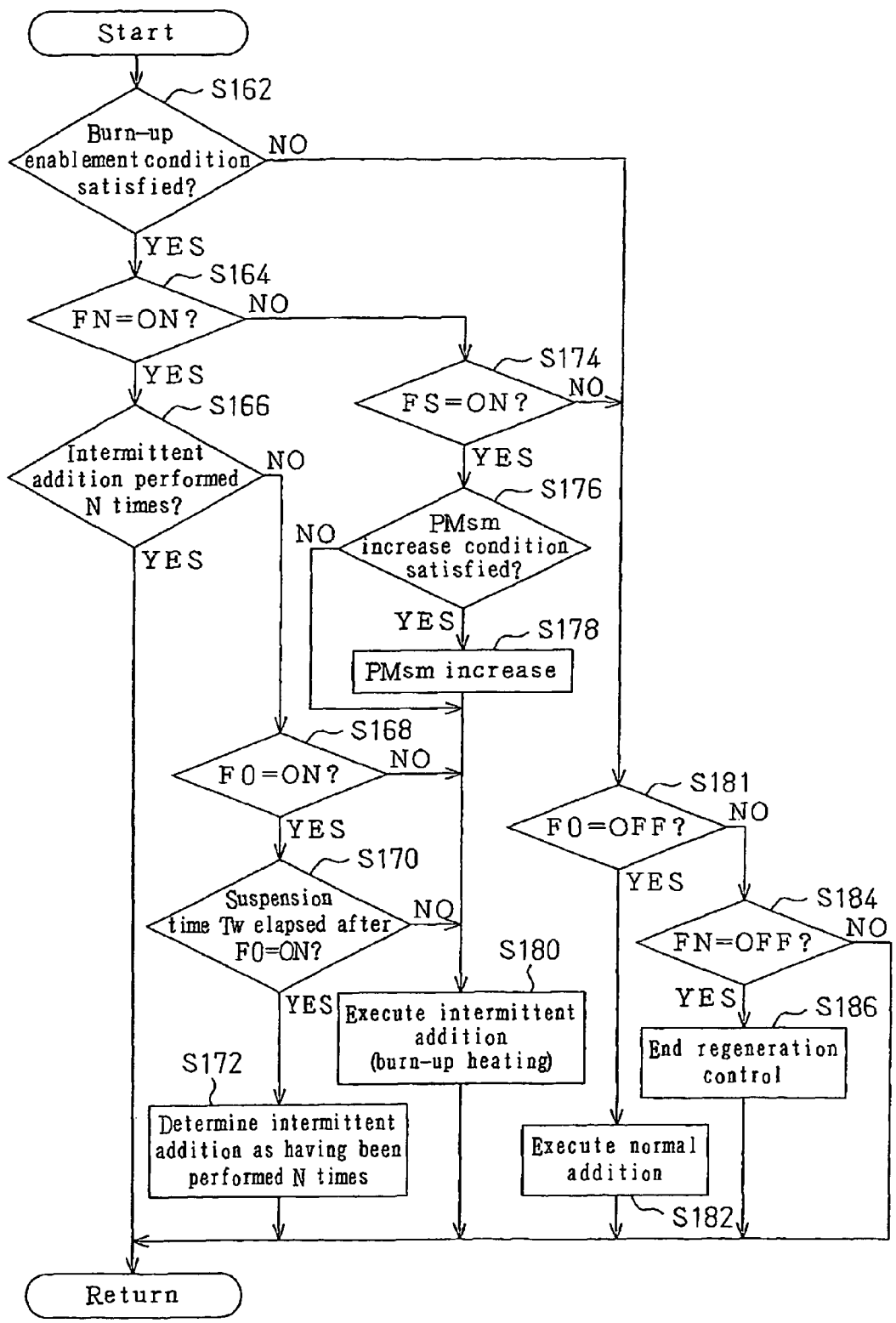
FIG. 4 is a flowchart showing a fuel addition process performed by the ECU of FIG. 1.

The processing executed by the ECU 70 in the regeneration mode will now be discussed. The flowchart of FIG. 2 showing the regeneration mode execution determination, the flowchart of FIG. 3 showing the regeneration control, and the flowchart of FIG. 4 showing the fuel addition process are each executed as interrupts in predetermined time cycles. The result of the regeneration mode execution determination in FIG. 2 determines whether to start the regeneration control in FIG. 3 and the fuel addition process in FIG. 4.

The regeneration mode execution determination (FIG. 2) will first be described. In step S102, the ECU 70 calculates the particulate matter emission amount PMe, which is the total amount of PM emitted from each combustion chamber 4 of the diesel engine 2 during one control cycle in FIG. 2. In this embodiment, the ECU 70 calculates the particulate matter emission amount PMe by referring to a map, which is generated in advance through experiments. The map associates the emission amount with, for example, the engine speed NE and with the engine load (e.g., the fuel injection amount of the fuel injection valve 58). The ECU 70 calculates the particulate matter emission amount PMe from the engine speed NE and the engine load.

In step S104, the ECU 70 calculates the oxidation amount PMc of PM that is accumulated or trapped in the filter 38*a*. The oxidation amount PMc is the amount of the trapped PM that is eliminated through oxidation during one control cycle of this process. In this embodiment, the ECU 70 calculates the oxidation amount PMc by referring to a map, which is generated in advance through experiments. The map associates the oxidation amount with the catalyst bed temperature of the filter 38*a* (e.g., the exhaust temperature thco detected by the second exhaust temperature sensor 46) and with an intake air amount GA. The ECU 70 calculates the oxidation amount PMc from the exhaust temperature thco and the intake air amount GA.

In step S106, the ECU 70 calculates an estimated PM accumulation amount PMsm using expression 1.

$$PMsm \leftarrow \text{Max}[PMsm + PMe - PMc, 0] \qquad (1)$$

In expression 1, the estimated accumulation amount PMsm in the right side is the value calculated in the previous cycle of this process. Max represents an operator for extracting the maximum value of the values in the parentheses. For example, when PMsm+PMe−PMc is a positive value, the resulting value of PMsm+PMe−PMc is set as the estimated accumulation amount PMsm at the left side of the expression. When PMsm+PMe−PMc is a negative value, zero (grams) is set as the estimated accumulation amount PMsm at the left side of the expression.

In step S108, the ECU 70 checks whether the estimated accumulation amount PMsm is greater than or equal to a regeneration reference value PMstart (reference accumulation amount) and determines whether to start the regeneration mode. When PMsm is less than PMstart (NO in step S108), the ECU 70 temporarily terminates this process. The state in which PMsm is less than PMstart corresponds to a state before timing t0 shown in the timing chart of FIG. 4.

When the state in which PMe is greater than PMc continues due to the driving state of the diesel engine 2, steps S102, S104, and S106 are repeated. This gradually increases the estimated accumulation amount PMsm. However, as long as PMsm is less than PMstart (NO in step S108), the ECU 70 temporarily terminates this process.

Figure 5:
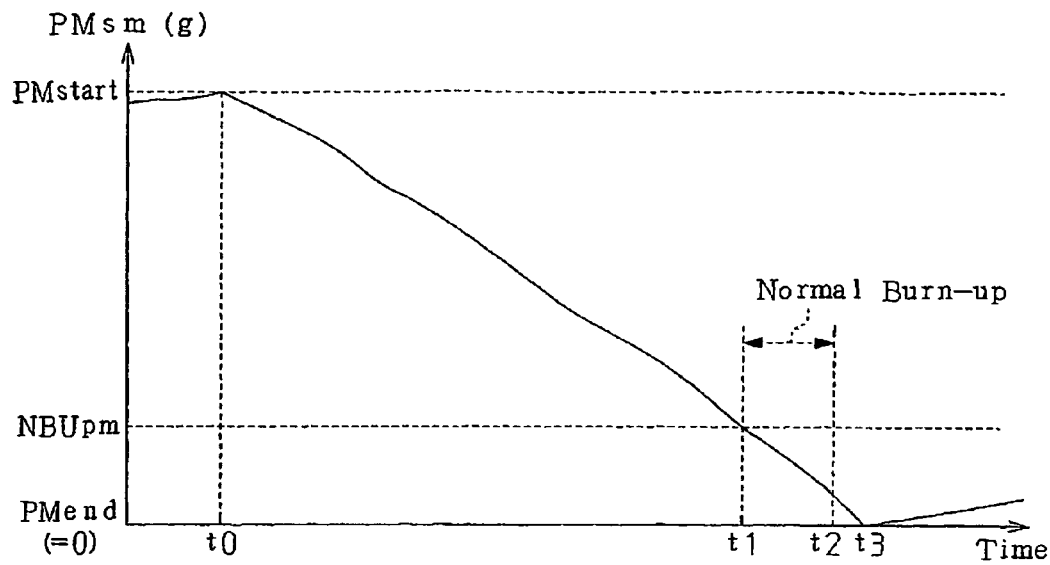
FIGS. 5 to 11 are timing charts showing examples of regeneration control in the first embodiment.

When the estimated accumulation amount PMsm increases and satisfies PMsm≧PMstart (YES in step S108), in step S110, the ECU 70 starts the regeneration control (t0 in FIG. 5). In this case, the regeneration control of FIG. 3 is performed cyclically. In step S110, the ECU 70 starts the regeneration control after setting the flags FN, FS, and F0 to OFF.

The regeneration control of FIG. 3 is described below. The ECU 70 executes regeneration control following the regeneration mode execution determination of FIG. 2. Accordingly, regeneration control is executed in the same cycle as the regeneration mode execution determination.

In step S122, the ECU 70 determines whether or not the estimated accumulation amount PMsm is greater than an end determination value PMend (for example, 0 g). In the initial stage of regeneration control (FIG. 3), the estimated accumulation amount PMsm is greater than the end determination value PMend (S122: YES). Then, in step S124, the ECU 70 determines whether or not the estimated accumulation amount PMsm is less than the special burn-up start determination value SBUpm. The special burn-up start determination value SBUpm is slightly greater than the end determination value PMend.

In the initial state of regeneration control (FIG. 3), The estimated accumulation amount PMsm is greater than the special burn-up start determination value SBUpm (S124: NO). Accordingly, the ECU 70 temporarily ends this process. As a result, the ECU 70 executes normal heating during the fuel addition process (FIG. 4), which will be described later. In normal heating, the ECU 70 continuously adds fuel from the adding valve 68 to the exhaust, and heats the NOx storage reduction catalyst 36a and filter 38a with the exhaust air-fuel ratio slightly higher than the stoichiometric air-fuel ratio (e.g., exhaust temperature thci=600 to 700° C.). Consequently, the particulate matter that accumulates in the NOx storage reduction catalyst 36a and filter 38a is burned relatively slowly and eliminated. Thereafter, when the estimated accumulation amount PMsm is greater than the special burn-up start determination value SBUpm (S124: NO), the ECU 70 continues normal heating.

Since normal heating reduces the particulate matter emission amount PMe to less than the oxidation amount PMc, the estimated accumulation amount PMsm gradually decreases (refer to expression 1). Accordingly, after time t0, the estimated accumulation amount PMsm continues to decrease, as shown in FIG. 5.

Thereafter, when the estimated accumulation amount PMsm becomes less than or equal to the special burn-up start determination value SBUpm (S124: YES), the ECU 70 determines in step S126 whether or not the ratio ΔP/GA is less than the mode changing reference value Dp. The ratio ΔP/GA (which is equivalent to the exhaust pressure difference) is the ratio of the pressure difference ΔP between the upstream and downstream sides of the filter 38a detected by the pressure difference sensor 50, and the air intake amount GA detected by the intake air amount sensor 24. The ratio ΔP/GA is a value for determining the degree of PM accumulation within the filter 38a as a flow resistance level regardless of the exhaust amount. The use of ΔP/exhaust amount instead of ΔP/GA is logical. However, since the air intake amount GA has a directly proportional relationship with the exhaust amount, there is no disadvantage to control accuracy even when ΔP/GA is used.

The mode changing reference value Dp represents the estimated ratio ΔP/GA under the condition of PMsm≦SBUpm. That is, the mode changing reference value Dp is used for determining whether or not more PM has actually accumulated on the accumulation filter 38a than the estimated accumulation amount PMsm.

When the condition ΔP/GA<Dp is satisfied (S126: YES), in step S128, the ECU 70 determines whether or not the special burn-up execution flag FS is set to OFF. When the flag FS is OFF (S128: YES), the ECU 70 determines in step S130 whether or not the estimated accumulation amount PMsm is less than or equal to the normal burn-up start determination value NBUpm. The normal burn-up start determination value NBUpm is slightly greater than the end determination value PMend and conforms to the relationship of NBUpm<SBUpm.

When the relationship of PMsm>NBUpm is satisfied (S130: NO), the ECU 70 adds fuel for normal heating in the fuel addition process (FIG. 4). Adding fuel for normal heating reduces the estimated accumulation amount PMsm by slowly burning PM.

When the estimated accumulation amount PMsm is equal to or less than the normal burn-up start determination value NBUpm (S130: YES; time t1 in FIG. 5), the ECU 70 determines in step S132 whether or not intermittent addition has been performed N times (three times in the first embodiment). At this time, the ECU 70 has still not performed intermittent addition to the exhaust (S132: YES). Accordingly, the ECU 70 sets the normal burn-up execution flag FN to ON in step S134. Since the normal burn-up execution flag FN is set to ON, the ECU 70 starts the normal burn-up for intermittently adding fuel from the adding valve 68 to the exhaust during fuel addition process (FIG. 4), which will be described later.

Thereafter, the flag FN is set to ON (S134) when steps S122, S124, S126, S128, S130, and S132 result in YES until the intermittent addition is completed N times in the normal burn-up.

When intermittent has been performed N times during the normal burn-up (S132: NO; time t2 in FIG. 5), then in step S136, the ECU 70 sets the normal burn-up execution flag FN to OFF. As a result, the ECU 70 switches from intermittent addition to normal heating fuel addition in the fuel addition process (FIG. 4).

Subsequently, when PMsm≦PMend is satisfied (S122: NO; time t3 in FIG. 5), the ECU 70 determines in step S140 whether or not intermittent addition has been completed N times in the normal burn-up. At this time, the intermittent addition has already been completed N times (S140: YES). Accordingly, the ECU 70 sets the normal burn-up execution flag FN to OFF in step S142. The process of step S140 is performed since the intermittent addition has not been completed N times even when PMsm≦PMend is satisfied.

Then, the ECU 70 sets the special burn-up execution flag FS to OFF in step S144 (at this time the flag FS has already been set to OFF since the beginning), and the regeneration control end flag F0 is set to ON in step S146. As a result, the ECU 70 ends the regeneration control in the fuel addition process (FIG. 4). Accordingly, the estimated accumulation amount PMsm continues to increase after time t3, as shown in FIG. 5.

Before the intermittent addition of N times is completed in the normal burn-up, burn-up enablement conditions may not be satisfied (S162: NO in FIG. 4). In this state, normal burn-up cannot be completed. Such a state is referred to as a suspension state. During the suspension state, normal heating (S182) may satisfy the condition of estimated accumulation amount PMsm≦PMend (S122: NO). In such case, the ECU 70 also sets the regeneration control end flag F0 to ON (step S146). In this case, the intermittent addition is continued for the normal burn-up due to the time condition (S170 in FIG. 4).

A case in which ΔP/GA≧Dp is satisfied in step S126 is described below. The description refers to the timing chart shown in FIG. 6.

In this case, in step S138, the ECU 70 sets the special burn-up execution flag FS to ON. As a result, the ECU 70 starts intermittent addition in the fuel addition process (FIG. 4) by means of the special burn-up process (time t11 in FIG. 6). Since the ECU 70 increases the estimated accumulation amount PMsm in the special burn-up process, the estimated accumulation amount PMsm is returned to a state in which it is greater than the special burn-up determination value SBUpm (S124: NO). However, since the flag FS is already set to ON, the ECU 70 continues intermittent addition in the fuel addition process (FIG. 4) by means of the special burn-up process (from time t11 in FIG. 6).

Subsequently, the ECU 70 continues to determine step S122 as YES and step S124 as NO, and the estimated accumulation amount PMsm decreases. Therefore, the estimated accumulation amount PMsm is less than or equal to the special burn-up determination value SBUpm (S124: YES) (time t12 in FIG. 6).

In this state, when ΔP/GA≧Dp is satisfied (S126: NO), the ECU 70 again sets the special burn-up execution flag FS to ON in step S138. As a result, in the fuel addition process, the ECU 70 increases the estimated accumulation amount PMsm a second time as indicated by the dashed line in FIG. 6. Accordingly, the estimated accumulation amount PMsm is greater than the special burn-up determination value SBUpm (S124: NO). In the fuel addition process (FIG. 4), the ECU 70 does not increase the estimated accumulation amount PMsm a third time.

Furthermore, when the condition PMsm≦SBUpm is satisfied a second time (S124: YES) and ΔP/GA<Dp is satisfied (S126: YES), the ECU 70 does not increase the estimated accumulation amount PMsm a second time in the fuel addition process (FIG. 4), as indicated by the solid line in FIG. 6.

Thereafter, when PMsm≦PMend is satisfied (S122: NO) through continuation of intermittent addition in the special burn-up process, the ECU 70 determines step S140 as NO, sets the special burn-up execution flag FS to OFF in step S144, and sets the regeneration control end flag F0 to ON in step S146. Accordingly, the estimated accumulation amount PMsm starts to increase after time t14 or time t15 in FIG. 6.

The fuel addition process (FIG. 4) is described below. The ECU 70 executes the fuel addition process following the regeneration control (FIG. 3). Accordingly, the fuel addition process is executed in the same cycle as the regeneration control.

First, in step S162, the ECU 70 determines whether or not the burn-up enablement condition is satisfied based on the operation conditions of the diesel engine 2. Specifically, the burn-up enablement condition is satisfied when the diesel engine 2 is operating in a condition in which the temperature of the exhaust discharged to the exhaust passage 34 is appropriate (for example, when the engine speed is in an intermediate range and the engine load is in an intermediate or high range). This would prevent inactivation of the catalytic function and adhesion of the added fuel to wall surfaces due to the lowered temperature of the filter 38a and NOx storage reduction catalyst 36a and prevent overheating due to the higher temperature of the exhaust.

When the burn-up enablement condition is satisfied (S162: YES), in step S164, the ECU 70 determines whether or not the normal burn-up execution flag FN is ON. When FN=OFF is satisfied (S164: NO), in step S174, the ECU 70 determines whether or not the special burn-up execution flag FS is ON. When FS=OFF is satisfied (S174: NO), in step S181, the ECU 70 determines whether or not F0=OFF is satisfied. When F0=OFF is satisfied (S181: YES), in step S182, the ECU 70 continuously adds fuel from the adding valve 68 to the exhaust (normal heating fuel addition).

Figure 7:
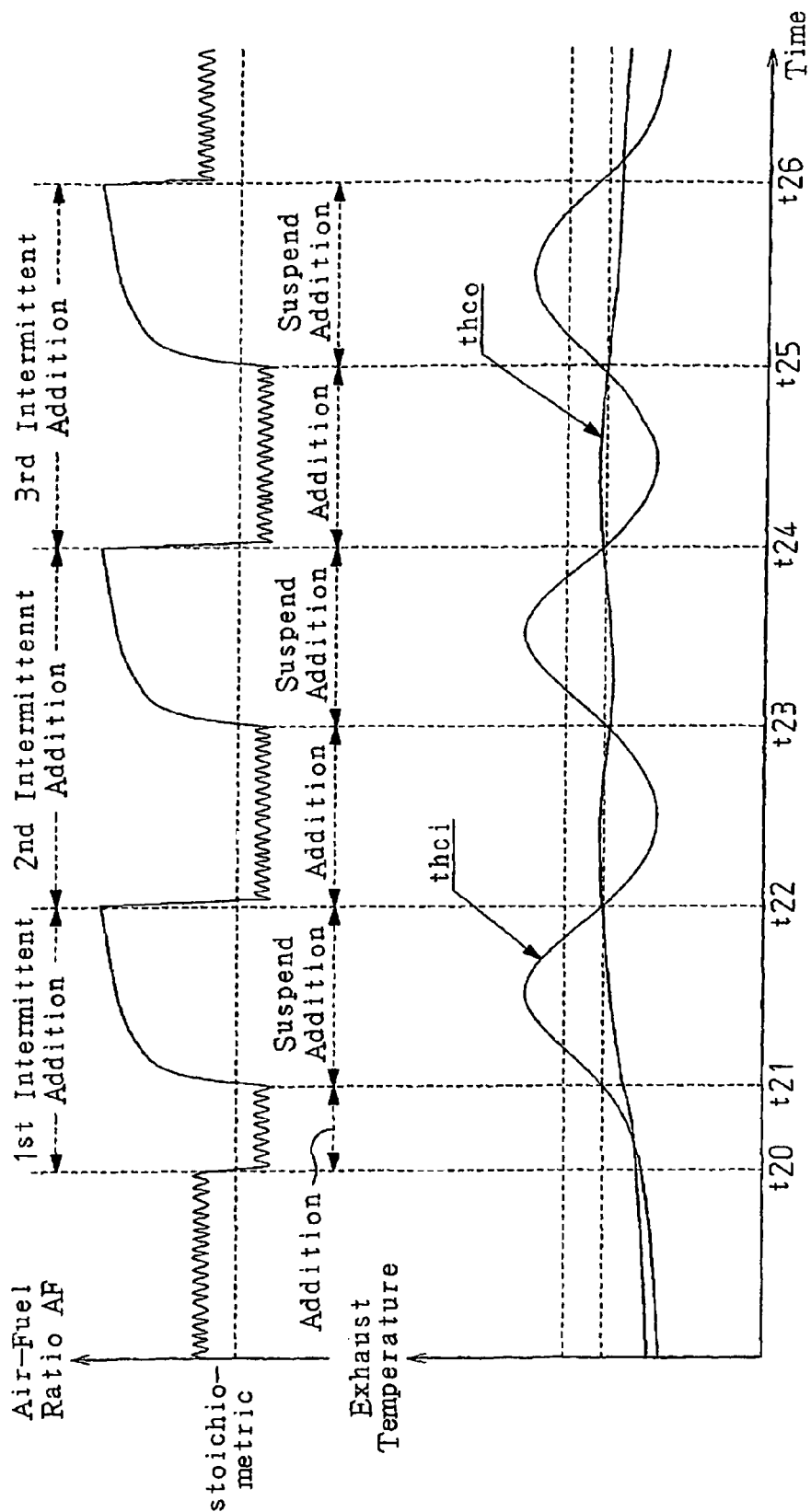

When the determination of the regeneration control (FIG. 3) is YES in steps S122 through S132, the flag FN is set to ON (S134, FIG. 3). In this case, in the fuel addition process (FIG. 4), the ECU 70 determines step S164 as YES. In step S166, the ECU 70 determines whether or not intermittent addition has been performed N times (three times in this embodiment). When intermittent addition has not been performed N times (S166: NO), the ECU 70 determines whether or not the regeneration control end flag F0 is ON in step S168. Since step S146 of regeneration control (FIG. 3) is not executed at this time, F0=OFF is satisfied (S168: NO), and the ECU 70 intermittently adds fuel from the adding valve 68 to the exhaust in step S180 (from time t20 in FIG. 7; from time t1 in FIG. 5). Specifically, the ECU 70 sets the amount of fuel repeatedly added from the adding valve 68, the period of fuel addition, and the period when fuel is not added. In this manner, the ECU 70 controls the air-fuel ratio of the exhaust so as to realize the activated oxygen state and exhaust temperatures thci and thco capable of burning up the PM accumulated in the filter 38a and the NOx storage reduction catalyst 36a.

In subsequent control cycles, when the number of times fuel is intermittently added to the exhaust is less than N times (S166: NO) and F0=OFF (S168: NO), the ECU 70 continues intermittent addition (S180). Thereafter, the number of intermittent additions reaches N times. Then, the ECU 70 sets the normal burn-up execution flag FN to OFF in step S136 of the regeneration control (FIG. 3). Subsequently, step S164 is determined as NO, step S174 is determined as NO, and step S181 is determined as YES. Accordingly, the ECU 70 returns to normal heating fuel addition (from time t26 in FIG. 7; from time t2 in FIG. 5).

When the estimated accumulation amount PMsm is less than or equal to The end determination value PMend before the number of intermittent additions reaches N times, the ECU 70 determines step S122 as NO in the regeneration control, and determines step S140 as NO. In this case, FN=ON is satisfied while F0=ON is satisfied (S146 in FIG. 3).

As a result, YES is determined in step S168 of the fuel addition process (FIG. 4). In step S170, the ECU 70 determines whether or not the suspension time Tw (equivalent to reference time) has elapsed since F0=ON was satisfied. The suspension time Tw represents the period until when PM accumulation is enhanced by the adhesion of added fuel to the wall surfaces and the occurrence of catalytic function inactivation due to the lower temperature of the NOx storage reduction catalyst 36a and filter 38a when fuel is not added. For example, the suspension time Tw may be set at 180 seconds.

Figure 8:
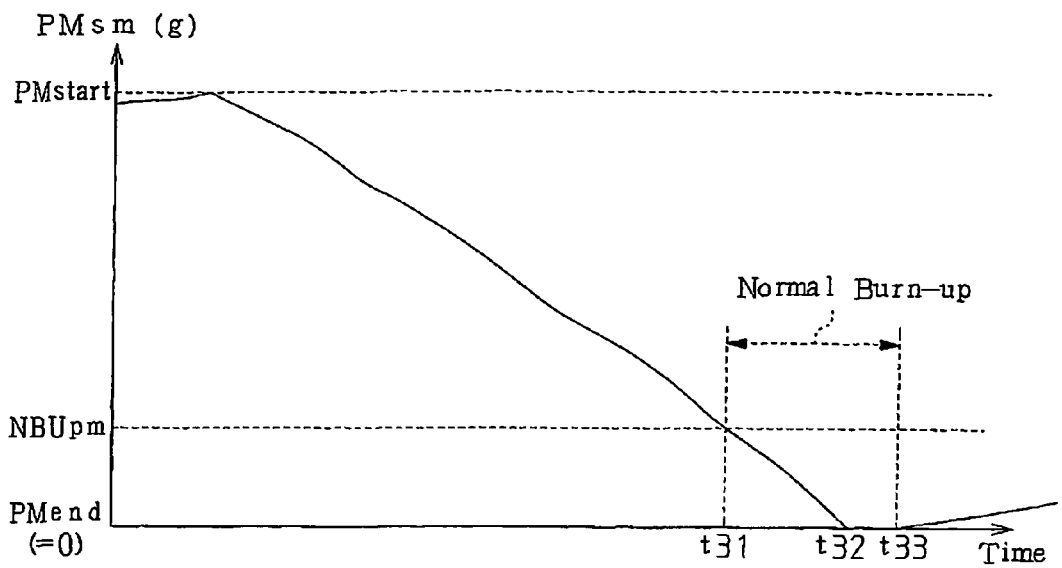

As shown in FIG. 8, when the burn-up enablement condition is satisfied (S162: YES) after the estimated accumulation amount PMsm becomes less than or equal to The end determination value PMend (from time t32), FN=ON is satisfied (S164: YES), and the ECU 70 determines whether or not the intermittent addition has been performed N times in step S166. Since the intermittent addition has not been performed N times (S166: NO), in step S168, the ECU 70 determines whether or not F0=ON is satisfied. Since F0=ON is satisfied (S168: YES), in step S170, the ECU 70 determines whether the suspension time Tw has elapsed. The suspension time Tw has not lapsed since PMsm≦PMend was satisfied (S170: NO). Thus, the ECU 70 continues intermittent addition (S180).

Thereafter, N times of intermittent additions are completed (t33). Then, YES is determined in step S140 of the regeneration control (FIG. 3), and the flag FN is set to OFF in step S142. As a result, NO is determined in steps S164 and S174 of the fuel addition process (FIG. 4), and step S181 is determined as NO. In step S184, the ECU 70 determines whether or not FN=OFF is satisfied. Since FN=OFF is satisfied (S184: YES), regeneration control ends (S186). That is, the ECU 70 stops the regeneration control (FIG. 3) and the fuel addition process (FIG. 4). Normal burn-up heating therefore ends.

Figure 9:
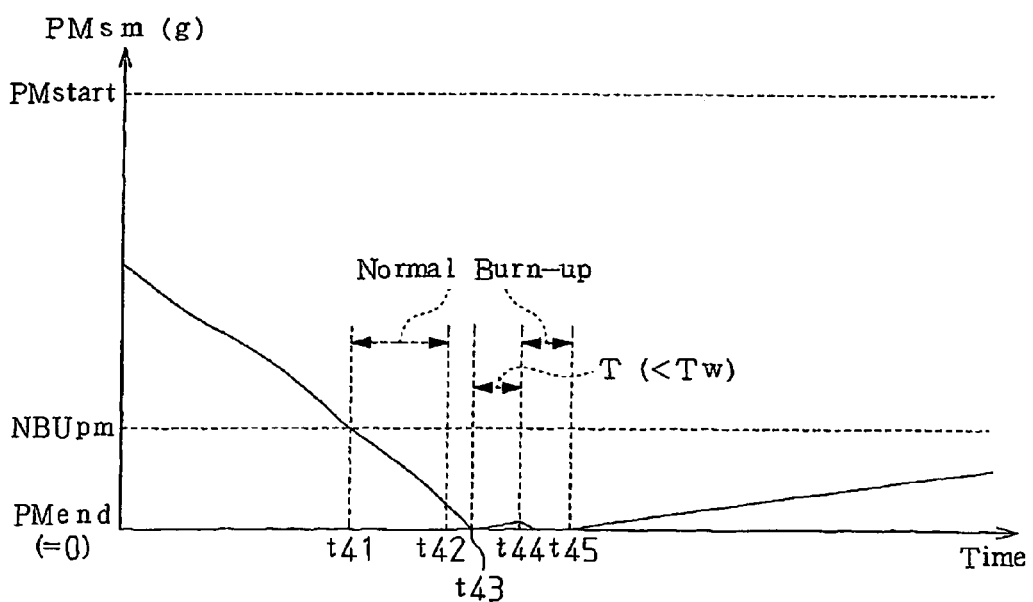

In the example of FIG. 9, after the normal burn-up heating starts (from t41) and before N times of intermittent additions are completed, the burn-up enablement condition is not satisfied (t42). Subsequently, after PMsm≦PMend is satisfied (t43) and before the suspension time Tw elapses (T<Tw), the burn-up enablement condition is satisfied (t44).

In this case, in the regeneration control (FIG. 3), NO is determined in step S122 (t43 in FIG. 9), and the flag F0 is set to ON (S146).

Thereafter, in the fuel addition process (FIG. 4), the ECU 70 determines that the burn-up enablement condition is not satisfied (S162: NO), F0=ON is satisfied (S181: NO), and FN=ON is satisfied (S184: NO). Thus, the ECU 70 continues to stop heating. Subsequently (t44), when the burn-up enablement condition is satisfied (S162: YES), the ECU 70 determines that FN=ON is satisfied (S164: YES), intermittent addition has not completed N times (S166: NO), FN=ON is satisfied (S168: YES), and that T<Tw is satisfied (S170: NO). Thus, the ECU 70 restarts the intermittent addition (S180).

When N times of intermittent additions are completed (FIG. 3, S140: YES), the flag FN is set to OFF (FIG. 3, S142). In the fuel addition process (FIG. 4), the ECU 70 determines step S164 as NO, step S174 as NO, that F0=ON is satisfied (S181: NO), and that FN=OFF is satisfied (S184: YES). This completes the regeneration control (S186, t45 in FIG. 9). Thus, normal burn-up heating ends.

Figure 10:
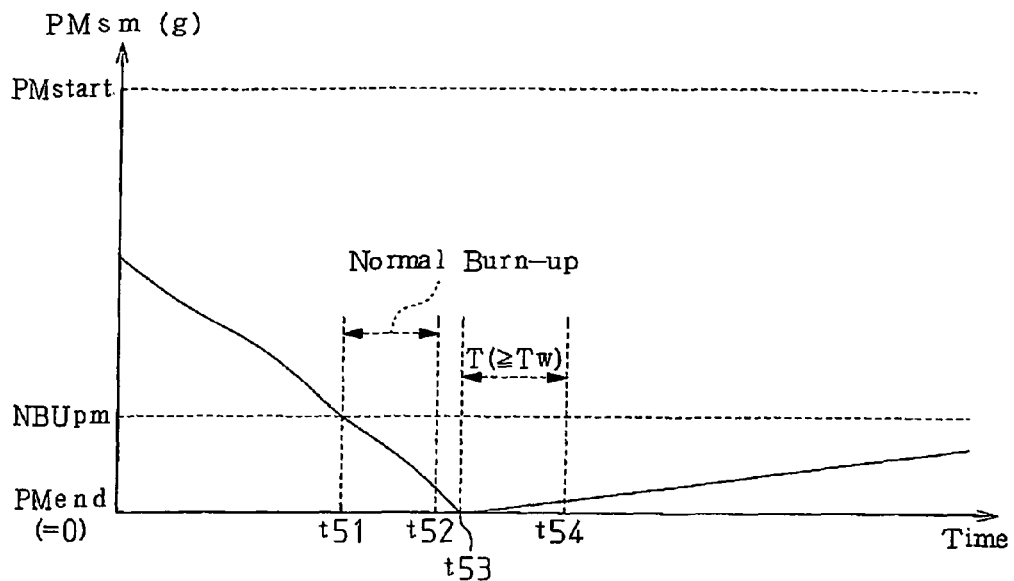

In the example of FIG. 10, after normal burn-up heating starts (from t51) and before the intermittent addition has been completed N times, the burn-up enablement is not satisfied (t52). Subsequently, after PMsm≦PMend is satisfied (t53) and the suspension time Tw has elapsed (T≧Tw), the burn-up enablement condition is satisfied (t54).

In this case, in the regeneration control (FIG. 3), step S122 is determined as NO (t53 in FIG. 10), and F0=ON is satisfied (S146).

Thereafter, in the fuel addition process (FIG. 4), the ECU 70 determines that the burn-up enablement condition is not satisfied (S162: NO), F0=ON is satisfied (S181: NO), and FN=ON is satisfied (S184: NO). Thus, the ECU 70 continues to stop heating. Subsequently (t54), even when the burn-up enablement condition is satisfied (S162: YES), the ECU 70 determines that FN=ON is satisfied (S164: YES), intermittent addition has not completed N times (S166: NO), FN=ON is satisfied (S168: YES), the suspension time Tw has elapsed (S170: YES), and the intermittent addition has been performed N times regardless of the actual number of times the intermittent addition has been performed (S172).

Accordingly, in the next control cycle, the ECU 70 determines step S132 as NO and sets the flag FN to OFF in step S136. Therefore, in the fuel addition process (FIG. 4), the ECU 70 determines step S164 as NO, step S174 as NO, and subsequently that F0=ON is satisfied (S181: NO) and FN=OFF is satisfied (S184: YES). As a result, the regeneration control ends (S186, t54 in FIG. 10). The regeneration control essentially ends when PMsm≦PMend is satisfied (t53), that is, normal burn-up heating ends at time t52.

Figure 11:
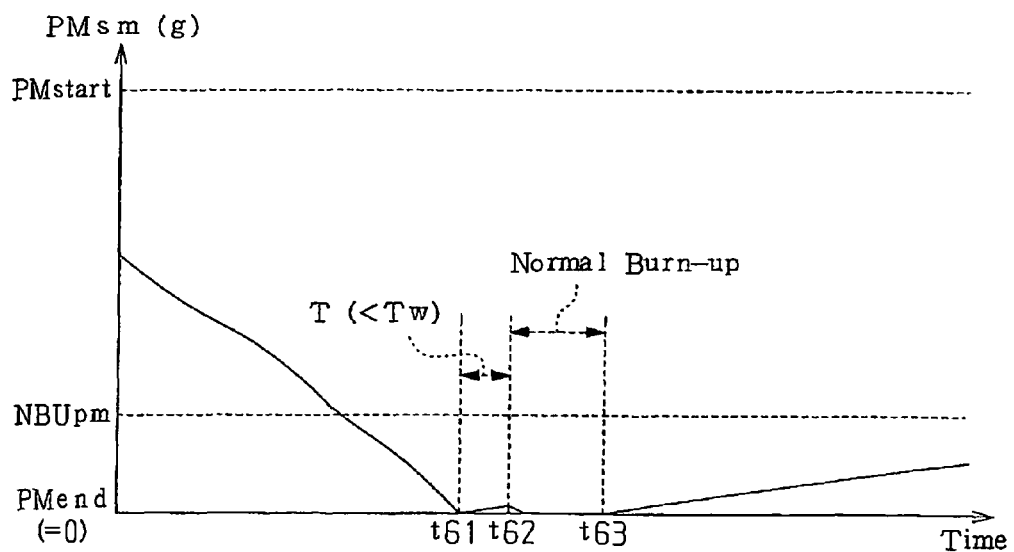

FIG. 11 shows an example in which the flag FN is set to ON in step S134, and the burn-up enablement condition is not satisfied. Before PMsm≦PMend is satisfied (t61), the ECU 70 does not execute intermittent addition for normal burn-up heating.

In FIG. 11, the burn-up enablement condition is satisfied before the suspension time Tw has elapsed (t62) since PMsm≦PMend is satisfied (t61). Accordingly, after intermittent addition is performed three times (t63) from time t62, the ECU 70 ends normal burn-up heating.

When the suspension time Tw elapses since PMsm≦PMend is satisfied (t61), the ECU 70 executes the process of step S172 and ends the regeneration control ends even though intermittent addition has never been performed. In this case, normal burn-up heating is not executed.

In regeneration control (FIG. 3), a case is described below in which the ECU 70 determines steps S122 and S124 as YES, step S126 as NO, and set the special burn-up execution flag FS to ON (step S138 in FIG. 3). In this case, the ECU 70 determines YES in step S174 of the fuel addition process (FIG. 4).

Then, in step S176, the ECU 70 determines whether or not the estimated accumulation amount PMsm increase condition is satisfied. The estimated accumulation amount PMsm increase condition is satisfied immediately after the flag FS is set to ON in step S138 and the number of times the estimated accumulation amount PMsm is increased by the process of step S176 is within the reference number of times (in this case, twice).

Initially, the estimated accumulation amount PMsm increase condition is satisfied (S176: YES). Accordingly, in step S178, the ECU 70 increases the estimated accumulation amount PMsm. For example, the estimated accumulation amount PMsm is increased at time t11 and time t12 in FIG. 6. Then, in step S180, the ECU 70 executes intermittent addition. In the next control cycle, the flag FS has already been set to ON. Accordingly, the ECU 70 determines step S176 as NO and does not increase the estimated accumulation amount PMsm.

Thereafter, intermittent addition continues while the condition of PMsm>SBUpm is satisfied (S124: NO in FIG. 3). Then, PMsm≦SBUpm is satisfied again (S124: YES in FIG. 3). In this state, when ΔP/GA≧Dp is satisfied (S126: NO in FIG. 3), the ECU 70 again executes the process of step S138 and increases the estimated accumulation amount PMsm in step S178 (broken line from t12 in FIG. 6). Subsequently, when PMsm≧SBUpm and ΔP/GA≧Dp are satisfied, the ECU 70 may advance to step S180. In this state, since the routine has advanced to step S180 for the third time, the ECU 70 does not increase the estimated accumulation amount PMsm (time t13 in FIG. 6).

If ΔP/GA<Dp is satisfied at time t12 (S126: YES in FIG. 3), the ECU 70 determines in step S128 whether or not FS=OFF is satisfied. Since FS=ON is satisfied (S128: NO in FIG. 3), the ECU 70 temporarily stops the process of the regeneration control (FIG. 3) without executing step S138. Accordingly, in the fuel addition process (FIG. 4), the estimated accumulation amount PMsm increase condition is not satisfied (S176: NO), and the ECU 70 does not increase the estimated accumulation amount PMsm (solid line from time t12 in FIG. 6).

Figure 6:
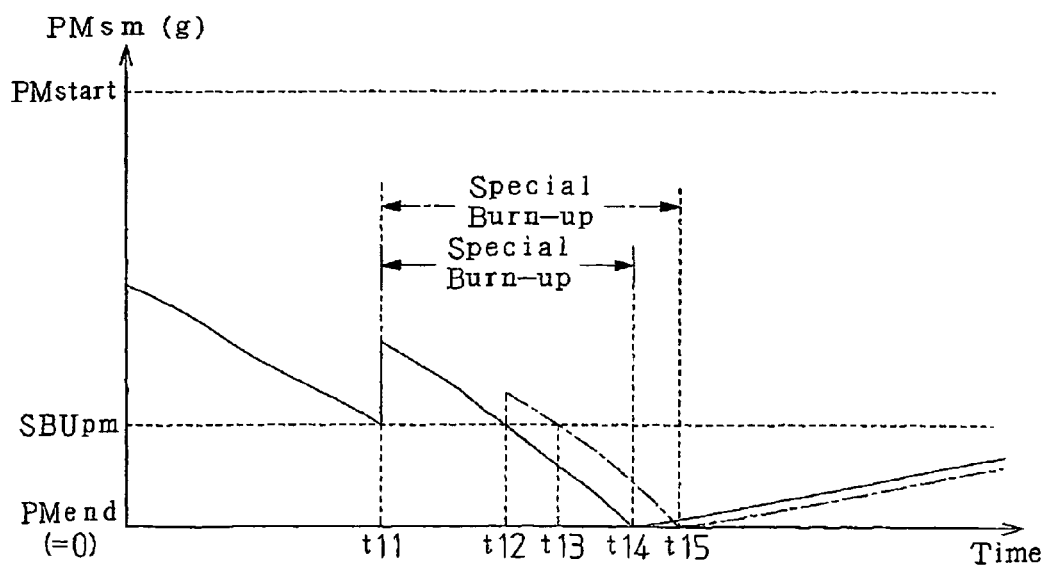

Thereafter, in the case of the broken line or solid line shown in FIG. 6, the condition of PMsm≦PMend is satisfied by continuing the intermittent addition (S122: NO in FIG. 3; time t14 or t15). The ECU 70 determines step S140 as NO, sets the flag FS to OFF in step S144, and sets F0 to ON in step S146. As a result, the regeneration control ends (S186) in the fuel addition process (FIG. 4) since the ECU 70 determines step S174 as NO, F0=ON is satisfied (S181: NO), and FN=OFF is satisfied (S184: YES). In this manner, special burn-up heating ends.

The regeneration control (FIG. 3) and fuel addition process (FIG. 4) are equivalent to a particulate material elimination heating (PM eliminating heating) and a mode change section. The range of the estimated accumulation amount PMsm under the special burn-up start determination value SBUpm and the range of the estimated accumulation amount PMsm under the normal burn-up start determination value NBUpm are respectively equivalent to the mode change range. The range of the estimated accumulation amount PMsm under the special burn-up start determination value SBUpm is equivalent to the first mode change range, and the range of the estimated accumulation amount PMsm under the normal burn-up start determination value NBUpm is equivalent to the second mode change range.

The pressure difference sensor 50 and intake air amount sensor 24 are equivalent to the difference detection unit. The process for determining the ON/OFF setting of the special burn-up execution flag FS by the relative determination of ΔP/GA<Dp in the regeneration control (FIG. 3) is equivalent to the process for determining the burn-up heating mode. The intermittent addition process performed N times is equivalent to the reference processing amount.

The first embodiment has the advantages described below.

(1) The ECU 70 changes the mode of the heating control (PM elimination heating control) for purifying the NOx storage reduction catalyst 36*a* and the filter 38*a* in the range in which the estimated accumulation amount PMsm is below the special burn-up start determination value SBUpm and the range in which the estimated accumulation amount PMsm is below the normal burn-up start determination value NBUpm.

The PM elimination heating control is performed in accordance with the estimated accumulation amount PMsm in this manner. Accordingly, although the PM elimination heating starts after a large amount of PM has accumulated in the NOx storage reduction catalyst 36*a* and the filter 38*a* in order to improve fuel efficiency, overheating does not occur. In other words, the first embodiment prevents overheating and reduction of fuel efficiency that would be caused by a single mode of continuous PM elimination heating control as in the conventional art.

Specifically, when the estimated accumulation amount PMsm is greater than the special burn-up start determination value SBUpm or the normal burn-up start determination value NBUpm, the ECU 70 slowly burns and eliminates PM from the NOx storage reduction catalyst 36*a* and the filter 38*a* through normal burning. When the estimated accumulation amount PMsm is less than the special burn-up start determination value SBUpm, and the condition related to the ratio ΔP/GA is satisfied, the ECU 70 intermittently adds fuel to the exhaust and burns the PM through the special burn-up heating. The ECU 70 executes this process until the condition estimated accumulation amount PMsm becomes less than or equal to the end determination value PMend.

Furthermore, when special burn-up heating is not executed and the estimated accumulation amount PMsm is less than the normal burn-up start determination value NBUpm, the ECU 70 burns the PM by intermittent fuel addition performed N times.

In this way, while the estimated accumulation amount PMsm is greater than the special burn-up start determination value SBUpm or normal burn-up start determination value NBUpm, which is near the end determination value PMend (for example, zero grams), the ECU 70 executes a slow PM elimination process. Therefore, overheating is prevented since a large amount of PM is not burned rapidly even though PM elimination heating is started after a large amount of PM has accumulated. Additionally, the fuel efficiency is prevented from decreasing since PM elimination heating is not often performed.

When the estimated accumulation amount PMsm is greater than or equal to the special burn-up start determination value SBUpm or normal burn-up start determination value NBUpm, the ECU 70 executes a process to burn up the PM by intermittent addition so the PM is all burned at once. Accordingly, PM is prevented from remaining in the NOx storage reduction catalyst 36*a* and filter 38*a*. This prevents the accumulation of residual PM, which is not expressed in the estimated accumulation amount PMsm.

In this way, the ECU 70 realizes a PM elimination process that is capable of preventing the burning of a large amount of PM all at once without increasing the frequency with which the PM elimination process is performed.

(2) Special burn-up heating is not executed unless the condition of ΔP/GA≧Dp is satisfied at least once even when the estimated accumulation amount PMsm is less than or equal to the special burn-up start determination value SBUpm. In this case, when PMsm≦NBUpm is satisfied, the ECU 70 executes normal burn-up heating. In normal burn-up heating, intermittent addition ends within N times.

In this way, the ECU 70 finely controls the degree of burn-up heating. That is, the ECU 70 only executes necessary burn-up heating insofar as the NOx storage reduction catalyst 36*a* and filter 38*a* are not clogged by large amounts of PM. This improves fuel efficiency.

(3) When the condition ΔP/GA≧Dp is satisfied when the estimated accumulation amount PMsm is less than the special burn-up start determination value SBUpm, there is a high probability that the actual PM accumulation amount is greater than the estimated accumulation amount PMsm. Accordingly, the ECU 70 increases the estimated accumulation amount PMsm in step S178.

That is, during special burn-up heating, the ECU 70 compensates for the deviation between the estimated accumulation amount PMsm and the actual PM accumulated amount in order to appropriately eliminate PM.

As a result, the ECU 70 is capable of more appropriate execution of the PM elimination process for preventing the burning of a large amount of PM all at once while not increasing the frequency with which the PM elimination process is performed.

(4) When ΔP/GA≧Dp has never been satisfied, the ECU 70 executes normal burn-up heating. In this case, it is not necessary to compensate for the deviation between the estimated accumulation amount PMsm and the actual PM accumulation amount as described in advantage (3) and PM is appropriately eliminated even when the execution of burn-up heating is limited. Accordingly, the ECU 70 executes burn-up heating for a number of times that is limited to a reference process amount. Specifically, intermittent addition is limited to three times. This improves fuel efficiency.

(5) The special burn-up start determination value SBUpm is greater than the normal burn-up start determination value NBUpm.

A certain level of detection accuracy is required for the ratio ΔP/GA in order to determine the execution of the process (S178) for increasing the estimated accumulation amount PMsm. Accordingly, the special burn-up start determination value SBUpm requires a certain level. When the estimated accumulation amount PMsm increase process (S178) is not executed, however, the detection accuracy of the ratio ΔP/GA may be relatively low. In this case, the normal burn-up start determination value NBUpm can be reduced. A large amount of PM all at once may be prevented and fuel efficiency may be improved by narrowing the range below the normal burn-up start determination value NBUpm.

(6) The ECU 70 limits the estimated accumulation amount PMsm increase process (S178) in special burn-up heating to a reference number of times (twice in the present case).

As a result, unlimited repetition of the estimated accumulation amount PMsm increase process (S178) is prevented even when incombustible materials such as ash and the like accumulate on the filter 38a, and the condition ΔP/GA≧Dp is continuous. Accordingly, the fuel efficiency is prevented from decreasing without extending special burn-up heating more than necessary.

(7) FIG. 10 shows a case in which the ECU 70 temporarily prevents (suspends) normal burn-up heating depending on the operation condition of the diesel engine 2. When such suspension occurs, there is a possibility that the NOx storage reduction catalyst 36a and filter 38a have a low temperature. Therefore, in this case, there is concern that the PM may increase by performing normal burn-up heating. The ECU 70 suspends the normal burn-up heating, and when the suspension time Tw (180 seconds) elapses from when the estimated accumulation amount PMsm becomes 0 (that is, from when the flag F0 is set to ON), the ECU 70 performs intermittent addition N times (S172). This prevents an increase in the PM accumulation in the NOx storage reduction catalyst 36a and filter 38a.

A regeneration controller for an exhaust purification apparatus of an internal combustion engine according to a second embodiment of the present invention will now be described.

In the second embodiment, the ECU 70 determines whether or not the exhaust temperature difference between the upstream and downstream sides of the filter 38a (thco-thci) is greater than a mode changing reference value Dth instead of determining the ratio ΔP/GA in step S126. When the condition of (thco-thci)≧Dth is satisfied (S126: NO), then in step S138, the ECU 70 sets the special burn-up execution flag FS to ON. Except for this point, the regeneration control device of the second embodiment has the same structure as that of the first embodiment.

The first exhaust temperature sensor 44 and second exhaust temperature sensor 46 are equivalent to the difference detection unit.

The second embodiment has the following advantages.

When a PM clogging occurs in the NOx storage reduction catalyst 36a upstream of the exhaust purification apparatus, the exhaust flows unevenly through the NOx storage reduction catalyst 36a, that is, it passes through part of the NOx storage reduction catalyst 36a. In this case, the exhaust generates less reaction heat within the NOx storage reduction catalyst 36a than when evenly passing through the NOx storage reduction catalyst 36a. As a result, there is more reaction heat within the filter 38a.

In the second embodiment, when the exhaust temperature difference (thco-thci) is greater than the mode changing reference value Dth, the ECU 70 executes special burn-up heating. This obtains advantages (1) through (7) of the first embodiment.

A regeneration controller for an exhaust purification apparatus of an internal combustion engine according to a third embodiment of the present invention will now be described.

Figure 12:
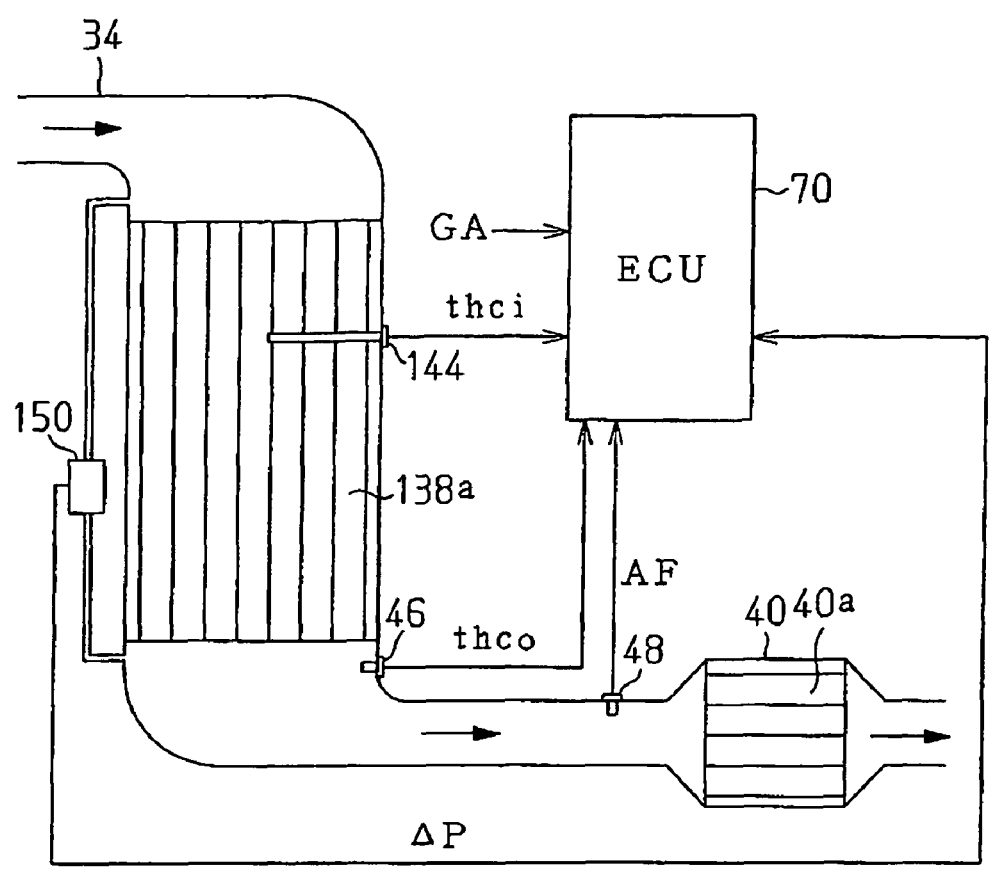
FIG. 12 is a schematic diagram showing an exhaust purification apparatus according to a third embodiment of the present invention.

In the third embodiment, the exhaust purification apparatus shown in FIG. 12 is used in place of the two catalytic converters, that is, the first catalytic converter and second catalytic converter shown in FIG. 1.

This exhaust purification apparatus includes a base, and one filter 138a which has a NOx storage reduction catalyst layer coating the base. A pressure difference sensor 150 detects the pressure difference ΔP between the upstream and downstream sides of the filter 138a. A first exhaust temperature sensor 144 detects the temperature (exhaust temperature thci) within the filter 138a. A second exhaust temperature sensor 46, an air-fuel ratio sensor 48, a third catalytic converter 40, and an oxidation catalyst 40a are identical to the corresponding components of FIG. 1 that are denoted the same reference numbers.

A difference detection unit, which includes the air intake amount sensor and pressure difference sensor 150, detects the ratio ΔP/GA. Another difference detection unit, which includes the first exhaust temperature sensor 144 and second exhaust temperature sensor 46, detects the exhaust temperature difference (thco-thci).

The ECU 70 executes the regeneration mode execution determination (FIG. 2), the regeneration control (FIG. 3), and fuel addition process (FIG. 4) of the first or second embodiments and functions in the same manner as the first or second embodiments. In the third embodiment, in step S126, the ECU 70 makes a determination based on at least one of the ratio ΔP/GA and exhaust temperature difference (thco-thci).

The third embodiment has the following advantages described below.

When the exhaust temperature difference (thco-thci) is used in the determination of step S126 of FIG. 3, the mechanism described in the advantages of the second embodiment is applied to the upstream and downstream sides of a single exhaust purification apparatus.

Furthermore, when the ratio ΔP/GA is used in the determination of S126 of FIG. 3, not only the downstream side, but also the upstream side is included in the subject of the differential pressure ΔP in the third embodiment. However, since the actual PM clogging of the downstream side is expressed in the ratio ΔP/GA, the mechanism described in the first embodiment is applicable.

Accordingly, the third embodiment has the advantages of the first or second embodiments.

It should be apparent to those skilled in the art that the present invention may be embodied in many other specific forms without departing from the spirit or scope of the invention. Particularly, it should be understood that the present invention may be embodied in the following forms.

In each of the above embodiments, the ECU 70 adjusts the exhaust air-fuel ratio by adding fuel (continuous addition, intermittent addition) from the adding valve 68 to the exhaust in the regeneration control. Alternatively, rather than fuel addition from the adding valve 68, or in addition to fuel addition from the adding valve 68, the ECU 70 may also adjust the air-fuel ratio by executing post injection (fuel injection into the combustion chamber during the exhaust stroke) from the fuel injection valve 58.

In each of the above embodiments, the ECU 70 detects the air intake amount GA by means of the intake air amount sensor 24. Alternatively, the ECU 70 may also calculate the exhaust flow amount using a map based on the operation state of the diesel engine 2, for example, the engine speed NE and the fuel injection amount so as to use the calculated exhaust flow amount rather than the air intake amount GA in the calculation of the ratio $\Delta P/GA$.

In each of the above embodiments, the special burn-up start determination value SBUpm is greater than the normal burn-up start determination value NBUpm. However, the special burn-up start determination value SBUpm may be equal to the normal burn-up start determination value NBUpm or the special burn-up start determination value SBUpm may be less than the normal burn-up start determination value NBUpm.

In each of the above embodiments, the normal burn-up start determination value NBUpm and the special burn-up start determination value SBUpm are values which are greater than the end determination value PMend. Alternatively, either of or both of the normal burn-up start determination value NBUpm and the special burn-up start determination value SBUpm may be the same value as the end determination value PMend.

In burn-up heating in each of the embodiments, the ECU 70 intermittently reduces the air-fuel ratio in the exhaust system by repeated fuel addition and stops adding fuel to the exhaust system. Alternatively, in burn-up heating, the ECU 70 may also intermittently reduce the air-fuel ratio of the exhaust system by repeated high-concentration fuel addition (or post injection) and low-concentration fuel addition (or post injection).

The present examples and embodiments are to be considered as illustrative and not restrictive, and the invention is not to be limited to the details given herein, but may be modified within the scope and equivalence of the appended claims.

The invention claimed is:

1. A method for eliminating particulate matter accumulated in an exhaust purification apparatus arranged in an exhaust system of an internal combustion engine, the method comprising:

estimating the amount of particulate matter accumulated in the exhaust purification apparatus to obtain an estimated accumulation amount;

determining whether the estimated accumulation amount is greater than a reference accumulation amount;

starting a normal heating mode for continuously keeping the air-fuel ratio in the exhaust system low by continuously adding fuel to exhaust when the estimated accumulation amount is greater than the reference accumulation amount;

determining whether the estimated accumulation amount is less than or equal to a normal burn-up start determination value, which is slightly greater than an end determination value and less than the reference accumulation amount; and changing from the normal heating mode to a burn-up heating mode for intermittently lowering the air-fuel ratio in the exhaust system by intermittently adding fuel to the exhaust when the estimated accumulation amount within a mode change range set in accordance with a state in which a great part of the accumulated particulate matter is eliminated from the exhaust purification apparatus and is less than or equal to the normal burn-up start determination value so that a temperature of a catalyst bed is elevated so that the temperature of the catalyst bed is higher in the burn-up heating mode than in the normal heating mode.

2. A method for eliminating particulate matter accumulated in an exhaust purification apparatus arranged in an exhaust system of an internal combustion engine, the method comprising:

estimating the amount of particulate matter accumulated in the exhaust purification apparatus to obtain an estimated accumulation amount;

determining whether the estimated accumulation amount is greater than a reference accumulation amount;

starting a normal heating mode for continuously keeping the air-fuel ratio in the exhaust system low by continuously adding fuel to exhaust when the estimated accumulation amount is greater than the reference accumulation amount;

determining whether the estimated accumulation amount is less than or equal to a determination value, which is less than the reference accumulation amount; and starting a burn-up heating mode for intermittently lowering the air-fuel ratio in the exhaust system by intermittently adding fuel to the exhaust when the estimated accumulation amount is within a mode change range set in accordance with a state in which a great part of the accumulated particulate matter is eliminated from the exhaust purification apparatus and less than or equal to the determination value so that a temperature of a catalyst bed is elevated so that the temperature of the catalyst bed is higher in the burn-up heating mode than in the normal heating mode, wherein in the burn-up heating mode, the amount of fuel repeatedly added, the period of fuel addition, and the period when fuel is not added are set so as to realize activated oxygen state and exhaust temperatures at upstream and downstream sides of the exhaust purification apparatus capable of burning up the particulate matter accumulated in the exhaust purification apparatus.

3. A regeneration controller for eliminating particulate matter accumulated in an exhaust purification apparatus that is arranged in an exhaust system of an internal combustion engine, the regeneration controller comprising:

a heating section for heating the exhaust purification apparatus to eliminate the particulate matter accumulated in the exhaust purification apparatus when an estimated accumulation amount is greater than a reference accumulation amount, wherein the heating section obtains the estimated accumulation amount by estimating the amount of particulate matter accumulated in the exhaust purification apparatus; and a mode change section for changing exhaust purification apparatus heating modes when heating the purification apparatus if the estimated accumulation amount is within a mode change range, wherein:

an exhaust having an air-fuel ratio flows the exhaust system;

the mode change range is set in accordance with a state in which a great part of the accumulated particulate matter is eliminated from the exhaust purification apparatus; and the mode change section changes the heating mode when the estimated accumulation amount is within the mode change range and less than or equal to a normal burn-up start determination value, which is slightly greater than an end determination value, from a normal heating mode, for heating the exhaust purification apparatus by continuously keeping the air-fuel ratio in the exhaust system low, to a burn-up heating mode, for burning up the particulate matter by intermittently lowering the air-fuel ratio in the exhaust system so that a temperature of a catalyst bed is elevated so that the temperature of the catalyst bed is higher in the burn-up heating mode than in the normal heating mode.

4. The regeneration controller according to claim 3, wherein the mode change section determines if the estimated accumulation amount is within the mode change range and changes the heating mode when the estimated accumulation amount is within the mode change range from the normal heating mode to the burn-up heating mode.

5. The regeneration controller according to claim 3, further comprising:
   a difference detection unit for detecting at least one of an exhaust pressure difference and an exhaust temperature difference between an upstream side and a downstream side of the exhaust purification apparatus, in which the exhaust purification apparatus is a downstream side one of at least two exhaust purification apparatuses arranged in the exhaust system;
   wherein the mode change section determines whether to change the heating mode to the burn-up heating mode based on at least one of the exhaust pressure difference and the exhaust temperature difference detected by the pressure detection unit.

6. The regeneration controller according to claim 5, wherein the mode change section increases the estimated accumulation amount and continues the burn-up heating mode when the exhaust pressure difference or the exhaust temperature difference detected by the difference detection unit is greater than a mode change reference value.

7. The regeneration controller according to claim 5, wherein the mode change section limits the execution of the burn-up heating to a predetermined number of times when the exhaust pressure difference or the exhaust temperature difference detected by the difference detection unit is less that a mode change reference value.

8. The regeneration controller according to claim 5, wherein the mode change range includes a first mode change range and a second mode change range, which is narrower than the first mode change range, and wherein the mode change section:
   increases the estimated accumulation amount and continues burn-up heating when the estimated accumulation amount is within the first mode change region and the exhaust pressure difference or the exhaust temperature difference detected by the difference detection unit is greater than the mode change reference value; and
   executes the burn-up heating in a manner limited to a predetermined number of times when the estimated accumulation amount is within the second mode change region and the exhaust pressure difference or the exhaust temperature difference detected by the difference detection unit is less than a mode change reference value.

9. The regeneration controller according to claim 3, wherein the exhaust purification apparatus includes a downstream portion, the regeneration controller further comprising:
   a difference detection unit for detecting exhaust temperature difference between an upstream side and a downstream side of the downstream portion the exhaust purification apparatus;
   wherein the mode change section determines whether to change the heating mode to the burn-up heating mode based on the exhaust temperature difference detected by the pressure detection unit.

10. The regeneration controller according to claim 9, wherein the mode change section increases the estimated accumulation amount and continues the burn-up heating mode when the exhaust pressure difference or the exhaust temperature difference detected by the difference detection unit is greater than a mode change reference value.

11. The regeneration controller according to claim 9, wherein the mode change section limits the execution of the burn-up heating to a predetermined number of times when the exhaust pressure difference or the exhaust temperature difference detected by the difference detection unit is less that a mode change reference value.

12. The regeneration controller according to claim 9, wherein the mode change range includes a first mode change range and a second mode change range, which is narrower than the first mode change range, and wherein the mode change section:
   increases the estimated accumulation amount and continues burn-up heating when the estimated accumulation amount is within the first mode change region and the exhaust pressure difference or the exhaust temperature difference detected by the difference detection unit is greater than the mode change reference value; and
   executes the burn-up heating in a manner limited to a predetermined number of times when the estimated accumulation amount is within the second mode change region and the exhaust pressure difference or the exhaust temperature difference detected by the difference detection unit is less than a mode change reference value.

13. The regeneration controller according to claim 3, further comprising:
   a difference detection unit for detecting exhaust pressure difference between an upstream side and a downstream side of the exhaust purification apparatus;
   wherein the mode change section determines whether to change the heating mode to the burn-up heating mode based on the exhaust pressure difference detected by the pressure detection unit.

14. The regeneration controller according to claim 13, wherein the mode change section increases the estimated accumulation amount and continues the burn-up heating mode when the exhaust pressure difference or the exhaust temperature difference detected by the difference detection unit is greater than a mode change reference value.

15. The regeneration controller according to claim 14, wherein the mode change section limits the number of times for increasing the estimated accumulation amount to a reference number of times or less.

16. The regeneration controller according to claim 13, wherein the mode change section limits the execution of the burn-up heating to a predetermined number of times when the exhaust pressure difference or the exhaust temperature difference detected by the difference detection unit is less than a mode change reference value.

17. The regeneration controller according to claim 16, wherein the mode change section:
   temporarily suspends execution of the burn-up heating when executing the burn-up heating in a manner limited to the predetermined number of times; and determines that the execution of the burn-up heating has been executed the predetermined number of times regardless of an actual number of times the burn-up heating has been performed after a predetermined period elapses from when the execution of the burn-up heating is suspended and the estimated accumulation amount becomes zero.

18. The regeneration controller according to claim 13, wherein the mode change range includes a first mode change range and a second mode change range, which is narrower than the first mode change range, and wherein the mode change section:

increases the estimated accumulation amount and continues burn-up heating when the estimated accumulation amount is within the first mode change region and the exhaust pressure difference or the exhaust temperature difference detected by the difference detection unit is greater than the mode change reference value; and executes the burn-up heating in a manner limited to a predetermined number of times when the estimated accumulation amount is within the second mode change region and the exhaust pressure difference or the exhaust temperature difference detected by the difference detection unit is less than a mode change reference value.

19. The regeneration controller according to claim 18, wherein the mode change reference value represents the exhaust pressure difference or the exhaust temperature difference that is predicted when the estimated accumulation amount is in the first mode change range.

20. The regeneration controller according to claim 18, wherein the mode change section limits the number of times for increasing the estimated accumulation amount to a reference number of times or less.

21. The regeneration controller according to claim 18, wherein the mode change section:

temporarily suspends execution of the burn-up heating when executing the burn-up heating in a manner limited to the predetermined number of times; and determines that the execution of the burn-up heating has been executed the predetermined number of times regardless of an actual number of times the burn-up heating has been performed after a predetermined period elapses from when the execution of the burn-up heating is suspended and the estimated accumulation amount becomes zero.

22. A regeneration controller for eliminating particulate matter accumulated in an exhaust purification apparatus that is arranged in an exhaust system of an internal combustion engine, the regeneration controller comprising:

a heating section for heating the exhaust purification apparatus to eliminate the particulate matter accumulated in the exhaust purification apparatus when an estimated accumulation amount is greater than a reference accumulation amount, wherein the heating section obtains the estimated accumulation amount by estimating the amount of particulate matter accumulated in the exhaust purification apparatus; and a mode change section for changing exhaust purification apparatus heating modes when heating the purification apparatus if the estimated accumulation amount is within a mode change range, wherein:

an exhaust having an air-fuel ratio flows the exhaust system;

the mode change range is set in accordance with a state in which a great part of the accumulated particulate matter is eliminated from the exhaust purification apparatus; and the mode change section changes the heating mode when the estimated accumulation amount is within the mode change range from a normal heating mode, for heating the exhaust purification apparatus by continuously keeping the air-fuel ratio in the exhaust system low, to a burn-up heating mode, for burning up the particulate matter by intermittently lowering the air-fuel ratio in the exhaust system so that a temperature of a catalyst bed is elevated so that the temperature of the catalyst bed is higher in the burn-up heating mode than in the normal heating mode;

in the burn-up heating mode, the amount of fuel repeatedly added, the period of fuel addition, and the period when fuel is not added are set so as to realize activated oxygen state and exhaust temperatures at upstream and downstream sides of the exhaust purification apparatus capable of burning up the particulate matter accumulated in the exhaust purification apparatus.

* * * * *

UNITED STATES PATENT AND TRADEMARK OFFICE
CERTIFICATE OF CORRECTION

PATENT NO. : 7,841,169 B2　　　　　　　　　　　　　　　　　　　　　　　Page 1 of 1
APPLICATION NO. : 10/589204
DATED : November 30, 2010
INVENTOR(S) : Tatsuhisa Yokoi et al.

It is certified that error appears in the above-identified patent and that said Letters Patent is hereby corrected as shown below:

| Column | Line | Claim | |
|--------|------|-------|---|
| 8 | 55 | 3 | Change "intermittent has" to --intermittent addition has--. |
| 18 | 62 | 3 | After "flows" insert --in--. |
| 19 | 45 | 7 | Change "less that" to --less than--. |
| 20 | 3 | 9 | After "portion" insert --of--. |
| 20 | 19 | 11 | Change "less that" to --less than--. |
| 22 | 20 | 22 | After "flows" insert --in--. |

Signed and Sealed this
Third Day of May, 2011

David J. Kappos
*Director of the United States Patent and Trademark Office*